(12) United States Patent
Jones

(10) Patent No.: US 6,179,314 B1
(45) Date of Patent: Jan. 30, 2001

(54) FRONT WHEEL DRIVE RIDE-ON VEHICLE

(75) Inventor: Michael D. Jones, Portland, OR (US)

(73) Assignee: Columbia-Inland Corporation, Oregon City, OR (US)

( * ) Notice: Under 35 U.S.C. 154(b), the term of this patent shall be extended for 0 days.

(21) Appl. No.: 09/305,246

(22) Filed: May 4, 1999

(51) Int. Cl.⁷ ..................................................... B62K 5/06
(52) U.S. Cl. .................. 280/282; 280/288.1; 280/288.3; 280/264; 188/68
(58) Field of Search ................................ 280/282, 288.1, 280/288.2, 288.3, 259, 264, 270, 92, 93.505; 188/19, 68; D12/112

(56) References Cited

U.S. PATENT DOCUMENTS

| | | | |
|---|---|---|---|
| Re. 32,681 | * 5/1988 | Randolph et al. | 280/261 |
| 180,820 | 8/1876 | Appel et al. . | |
| 375,755 | 1/1888 | Kidder . | |
| 1,154,208 | 9/1915 | Rundle . | |
| 1,620,926 | 3/1927 | Trullinger . | |
| 1,933,955 | * 11/1933 | Arnold | 188/24 |
| 2,201,440 | * 5/1940 | Letourneau et al. | 280/88 |
| 2,505,464 | * 4/1950 | Debuit | 280/260 |
| 3,827,719 | * 8/1974 | Lohr et al. | 280/259 |
| 3,960,392 | * 6/1976 | Read | 280/282 |
| 4,861,055 | 8/1989 | Jones . | |
| 4,925,200 | 5/1990 | Jones . | |
| 5,551,719 | * 9/1996 | Rettger, Jr. | 280/282 |
| 5,829,772 | 11/1998 | Jones . | |
| 5,901,973 | * 5/1999 | Warren | 280/260 |

* cited by examiner

Primary Examiner—Brian L. Johnson
Assistant Examiner—Avraham H. Lerner
(74) Attorney, Agent, or Firm—Robert D. Varitz, PC

(57) ABSTRACT

A human-powered ride-on vehicle for a rider includes an integrated body/frame element having a seat for the rider formed thereon; a pair of spaced-apart front wheels mounted to the body/frame element, wherein at least one of the front wheels is driven by the rider; a rear wheel mounted on the body/frame; and a steering mechanism to steer said the wheel, wherein the steering mechanism includes a control stick mounted for shifting movement; and a linkage between the control stick and the rear wheel is operable to shift the rear wheel in a predetermined direction corresponding to the control stick when the control stick is shifted.

20 Claims, 2 Drawing Sheets

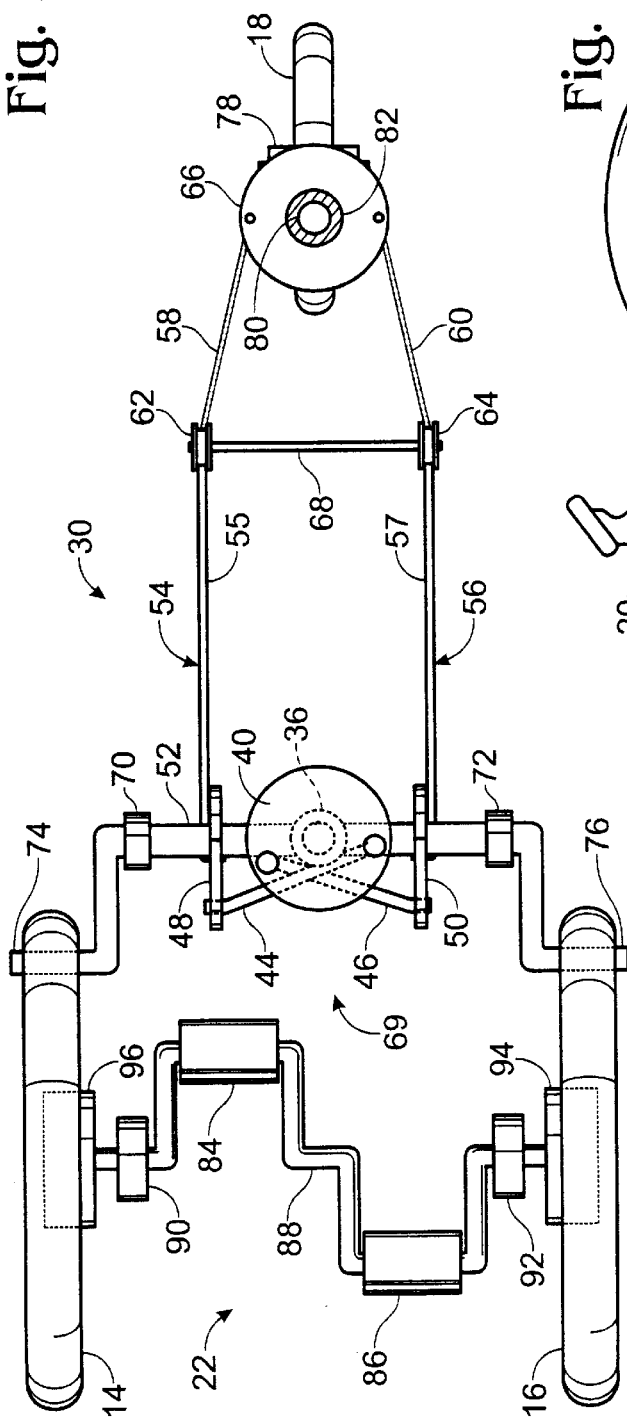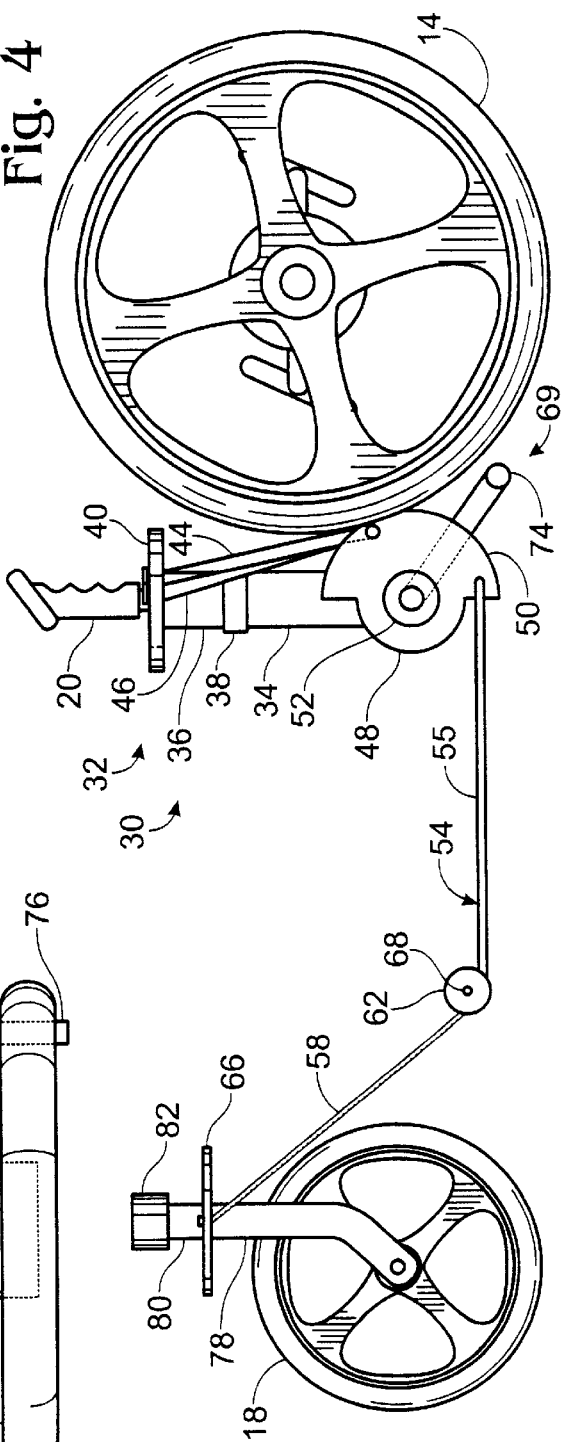

US 6,179,314 B1

FRONT WHEEL DRIVE RIDE-ON VEHICLE

FIELD OF THE INVENTION

This invention relates to human-powered ride-on vehicles, and specifically to a front wheel drive ride-on vehicle having a rear steerable wheel that is shiftable to an orientation substantially normal to the driving wheel.

BACKGROUND OF THE INVENTION

There are many forms of human-powered vehicles described in the patent and technical literature. Some of these known vehicles are intended to provide a carnival-type ride, wherein the rider may, at the rider's will, be subjected to G-forces, generally of the lateral variety. Ride-on vehicles such as the Big Wheel® achieve such G-forces through the provision of a large, driven front wheel, and the provision of independent braking systems on much smaller rear wheels. As the front wheel is also the source of motive power for the Big Wheel®, the rider frequently loses the ability to provide continued power during a turn, as the turning of the wheel forces the rider's foot off of the associated pedal on the side ow the wheel away from the turn.

A variety of power and braking systems are known for human powered, ride-on vehicles. An early braking system is described in U.S. Pat. No. 180,820, to Appel et al., granted Aug. 8, 1876 for Brakes for light vehicles. This reference depicts a braking system wherein bars are placed in frictional contact with wheels.

U.S. Pat. No. 375,755, to Kidder, granted Jan. 3, 1888, for Velocipede depicts a tricycle having large, powered rear wheels and a small, steerable front wheel, mounted on a curved, non-forked support.

U.S. Pat. No. 1,154,208, to Rundle, granted Sept. 21, 1915, for Propulsion Mechanism, depicts a braking system applied to steerable front wheels.

U.S. Pat. No. 1,620,926, to Trullinger, granted Mar. 15, 1927, for Coaster Wagon depicts a steering mechanism which incorporates a pivotable steering linkage.

U.S. Pat. No. 4,861,055, granted Aug. 29, 1989 for Drive Mechanism; U.S. Pat. No. 4,925,200, granted May 15, 1990 for Tricycle Drive Mechanism; and U.S. Pat. No. 5,829,772, granted Nov. 3, 1998 for Ride-on, Human-powered Vehicle Drive and Steering Mechanism are my previously issued patents depicting a variety of propulsion, steering and braking mechanism.

SUMMARY OF THE INVENTION

A human-powered ride-on vehicle for a rider includes an integrated body/frame element having a seat for the rider formed thereon; a pair of spaced-apart front wheels mounted to the body/frame element, wherein at least one of the front wheels is driven by the rider; a rear wheel mounted on the body/frame; and a steering mechanism to steer said wheel, wherein the steering mechanism includes a control stick mounted for shifting movement; and a linkage between the control stick and the rear wheel is operable to steer the rear wheel in a predetermined direction corresponding to the control stick when the control stick is shifted.

An object of the invention is to provide a ride-on vehicle having front wheel drive.

Another object of the invention is to provide a front wheel drive vehicle that has a free-wheeling drive wheel.

A further object of the invention in to provide a vehicle having a steerable wheel that may be oriented substantially normal to the driving wheel.

Yet another object of the invention is to provide a vehicle having a single control mechanism for steering and braking.

These and other objects and advantages of the invention will become more fully apparent as the description which follows is read in conjunction with the drawing.

BRIEF DESCRIPTION OF THE DRAWINGS

FIG. 4 is a somewhat schematic, side elevation of a steering mechanism and a braking mechanism of the invention.

FIG. 5 is a top plan view of the steering and braking mechanisms of FIG. 4.

DETAILED DESCRIPTION OF THE PREFERRED EMBODIMENT

Figure 1:
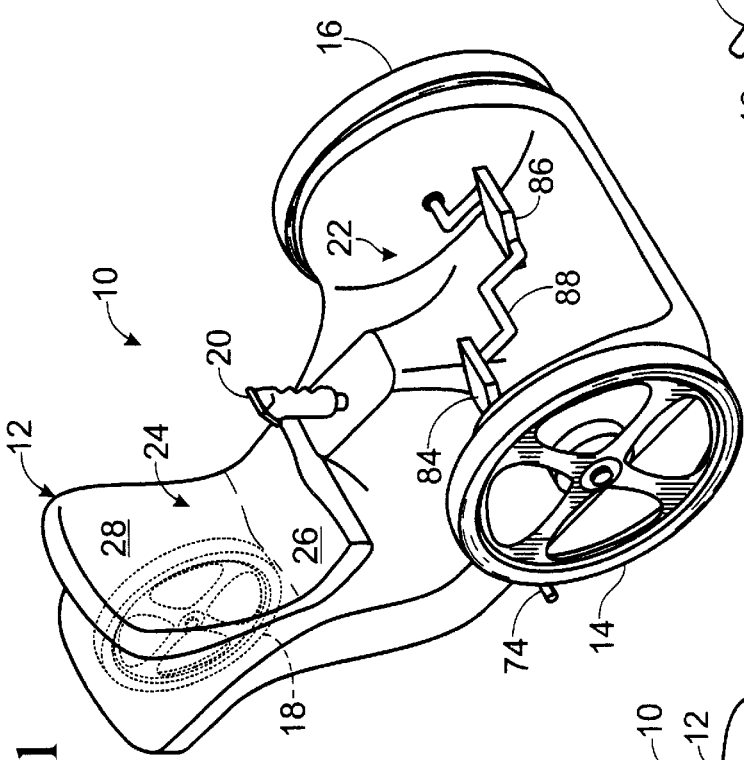
FIG. 1 is a perspective view of the ride-on vehicle of the invention.
Figure 2:
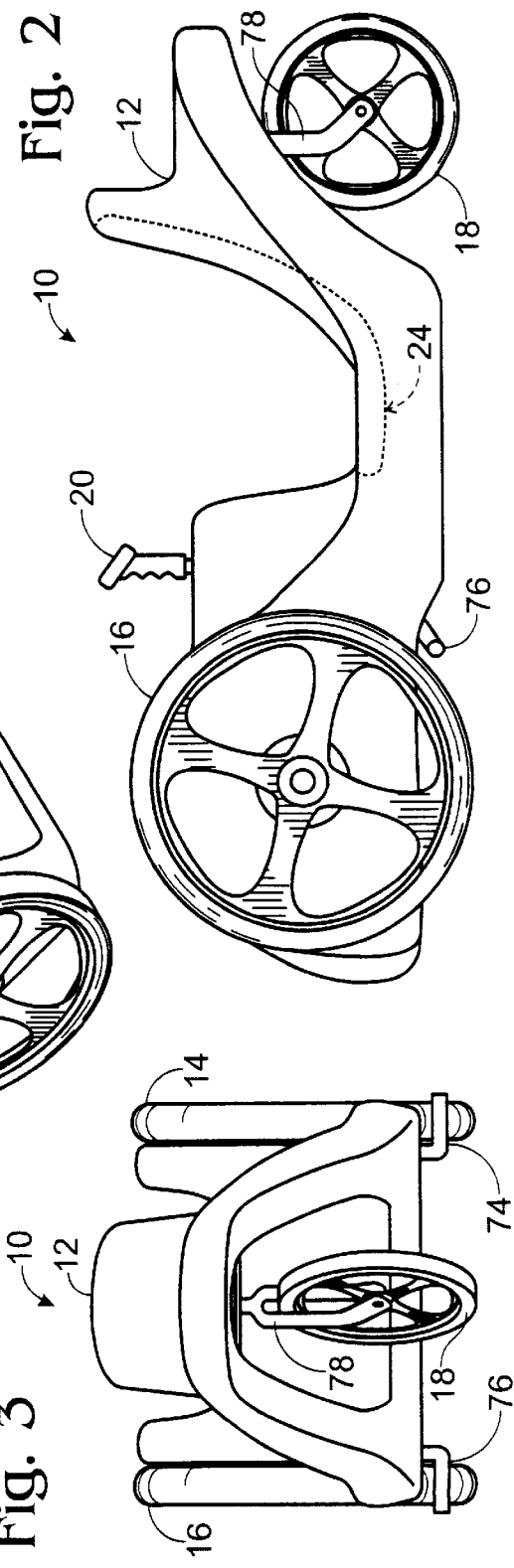
FIG. 2 is a side elevation of the vehicle of FIG. 1.
Figure 3:
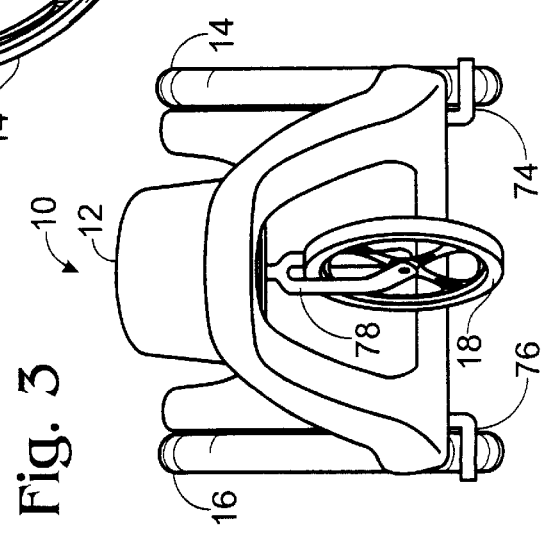
FIG. 3 is a rear view of the vehicle of FIG. 1.

Referring now to FIGS. 1–3, a ride-on vehicle constructed according to the invention is depicted generally at 10. Vehicle 10 includes a body/frame element 12, which provides a mounting structure for a pair of spaced-apart front driving wheels 14, 16, a rear, steerable wheel 18, a control stick 20, and a pedal mechanism 22. Body/frame element 12 is an integrated structure that provides support for a rider and also provides mounts for the various components of the vehicle.

Vehicle 10 is constructed to provide an exceptionally low center-of-gravity, as the vehicle is capable of extreme spin-out maneuvers which result in lateral G-forces, which, were the vehicle not so constructed, would likely result in the separation of the rider from the vehicle during such maneuvers. To this end, it may be seen that body 12 includes a seat 24 for the rider, which seat is contoured to provide an indented area 26 for the rider's bottom, and another indented area 28 which substantially conforms to the rider's back. Front wheels 14, 16 are substantially larger than rear wheel 18, again, to provide greater stability for the vehicle.

In order to provide for lateral G-force maneuvers, steerable wheel 18 is constructed and arranged to be rotatable to substantially 90° to front wheels 14, 16. This allows vehicle 10 to pivot about either front wheel, depending on the direction of deflection of control stick 20. In some instances, the vehicle may be constructed with differential braking, which will further accentuate the spin-out characteristics of the vehicle. A steering mechanism is operable to steer rear wheel 18 in a predetermined direction corresponding to a shifting movement of control stick 20.

Referring now to FIGS. 4 and 5, the steering mechanism, indicated generally at 30, of the invention will be further described. Control stick 20 is mounted on a control shaft 32, which includes a lower portion 34 and an upper portion 36. A pivot point 38 is located between lower portion 34 and upper portion 36, which allows for a side-to-side shifting movement of control stick 20 about pivot point 38. Steering mechanism 30 includes a steering linkage 39, which includes a swash plate 40, which is fixed to upper portion 36 below a hand grip 42 of control stick 20. Swash plate 40 has opposed first control rods 44,46 attached thereto, which control rods extend downward, and in the preferred embodiment, cross one another, before connecting to spaced-apart bell cranks 48, 50, respectively. Bell cranks 48, 50, are independently rotatably mounted on a brake actuator 52, which also serves as a mount for control shaft 32 lower portion 34. A pair of horizontal control links 54, 56 extend from bell cranks 48, 50 rearward. In the preferred embodiment, control links 54, 56 include horizontal control rods 55, 57 which terminate in a pair of flexible cables 58, 60, respectively. Cables 58, 60 extend over pulleys 62, 64 and terminate at a steering ring 66 of rear wheel 18. Pulleys rotate on a shaft 68, which is mounted to body 12. Alternately, the cross-over between the steering linkage components may be located adjacent the rear of the linkage mechanism, or anywhere along the length thereof.

As will be apparent to those of skill in the art, when control stick 20 is shifted, for instance, to the right of the vehicle, swash plate 40 is also tilted to the right, pulling first control rod 44 upwards, rotating bell crank 48 clockwise, pulling horizontal control rod 54 and cable 58 forward, and turning rear wheel 18 to the right. In this instance, the predetermined direction for rear wheel 18 is to the right, which corresponds to a shifting movement of control stick 20 to the right. Other configurations may provide for control stick 20 to be moved fore and aft to steer, or a twisting movement may be allowed, although one of the benefits of the side-to-side shifting is that a rider may generally be able to exert a greater steering pressure moving control stick 20 about its pivot point than would be accomplished with a twisting movement. The swash plate, control rods, bell crank and steering ring are constructed and arranged so that rear wheel 18 may be rotated to be substantially normal to front wheel 14 and 16.

A braking mechanism, shown generally at 69, includes elongate brake actuator 52, which is mounted in bearings 70, 72, which are mounted to body 12. Brake actuator 52 is mounted for transverse rotational movement relative to body 12. A pair of brake arms 74, 76 are fixed at either end of brake actuator 52, and contact wheels 14, 16, respectively, in a frictional braking contact, when control stick 20 is pulled rearward by the rider, thus applying rearward rotational movement to brake actuator 52. Braking mechanism 69 may be modified to operate on only one of the front wheels, or may be further modified to operate on either or both of the front wheels, depending on the rider's actions. In one form of the modified braking mechanism, push buttons may be installed on control stick 20, and linked by cable to brake arms 74, 76, to selectively engage either or both of the brake arms. In another form of the modified braking mechanism, the engagement of brake arms 74, 76 may be selected by the rider by means of a solenoid clutch arrangement, whereby one or both of the brake arms engage their respective wheel upon back force applied to control stick 20.

Rear wheel 18 is mounted on a cambered arm 78, which in turn is mounted on a rear-wheel shaft 80, which is rotatably mounted in a rear-wheel mount 82, located on the underside of body 12. Steering ring 66 is fixed to rear-wheel shaft 80. Cambered arm 78 provides that wheel 18 will substantially align with front wheels 14,16 when control stick 20 is neutralized, i.e., no right or left forces are applied thereto. With full deflection of control stick 20, the steering linkage will rotate rear wheel 18 on shaft 80 so that wheel 18 is substantially normal to front wheels 14, 16, which results in the aforementioned extreme spin-out maneuvers.

Pedal mechanism 22 provides motive power for vehicle 10 by virtue of pedals 84, 86 which are mounted on a pedal bar 88. Pedal bar 88 is mounted to body 12 by bearings 90, 92. One or both front wheels may be driven. In the preferred embodiment, only left front wheel 16 is driven, and includes a racheting drive hub, such as a BMX® hub 94 located between pedal bar 88 and wheel 16. In this embodiment, wheel 14 is mounted to be free-wheeling on pedal bar 88. A second racheting drive hub 96 may be included in wheel 14, in which case, both front wheels are driven. It will be appreciated that regardless of whether one or both front wheels are driven, the wheels will free-wheel on their respective racheting drive hubs when the rider stops pedalling.

Thus, a front wheel drive ride-on vehicle capable of extreme spin-out maneuvers has been disclosed. Although a preferred embodiment of the ride-on vehicle, and several variations thereof, have been disclosed, it will be appreciated that further modification and variations thereof may be made without departing from the scope of the invention as defined in the appended claims.

I claim:

1. A human-powered ride-on vehicle for a rider comprising:
    an integrated body/frame element having a seat for the rider integrally formed in said body/frame element;
    a pair of spaced-apart front wheels mounted to said body/frame element, wherein at least one of said front wheels is driven by the rider;
    a rear wheel mounted on said body/frame element; and
    a steering mechanism to steer said rear wheel, wherein said steering mechanism includes:
        a control stick mounted for shifting movement; wherein said control stick includes a control shaft having a lower portion and an upper portion, and wherein said upper portion is pivotable about a pivot point relative to said lower portion for side-to-side shifting movement; and which further includes a swash plate fixed to said upper portion; and wherein said linkage includes a pair of bell cranks and a steering plate for steering said rear wheel, and which further includes a pair of spaced apart first control rods extending between said swash plate and said bell cranks in a crossed relationship, and a pair of horizontal control links extending between said bell cranks and said steering plate; and
        a linkage between said control stick and said rear wheel operable to steer said rear wheel in a predetermined direction corresponding to said control stick when said control stick is shifted.

2. The vehicle of claim 1 wherein said horizontal control link includes a horizontal control rod and cable portion.

3. The vehicle of claim 1 which further includes a pulley associated with each control link wherein said control link rides on said pulley.

4. The vehicle of claim 1 wherein said rear wheel is carried on a cambered arm.

5. The vehicle of claim 1 which further includes a braking mechanism having an elongate brake actuator mounted on said body/frame element for transverse rotational movement relative thereto, and which further includes at least one brake arm located at an end of said brake actuator, wherein said brake arm is placed in frictional, braking contact with a front wheel when rearward rotational movement is applied to said brake actuator.

6. The vehicle of claim 5 wherein said control stick is fixed to said brake actuator, and wherein rearward movement of said control stick is operable to provide rearward rotational movement of said brake actuator.

7. The vehicle of claim 5 which includes a brake arm located at each end of said brake actuator, and wherein the rider may selectively engage said brake arms.

8. The vehicle of claim 1 which includes a pedal mechanism having a pedal bar rotatably mounted on said body/frame element, and wherein said front wheels are carried on said pedal bar.

9. The vehicle of claim 8 wherein one of said front wheels is mounted on said pedal bar for free-wheeling and wherein the other of said front wheels is mounted on said pedal bar by a racheting drive hub.

10. The vehicle of claim 8 wherein both of said fronts wheels are mounted on said pedal bar by a racheting drive hub.

11. A human-powered ride-on vehicle for a rider comprising:
- an integrated body/frame element having a seat for the rider formed thereon;
- a pair of spaced-apart front wheels mounted to said body/frame element, wherein at least one of said front wheels is driven by the rider;
- a rear wheel mounted on said body/frame element; and
- a steering mechanism to steer said rear wheel, wherein said steering mechanism includes:
  - a control stick mounted for side-to-side shifting movement, wherein said control stick includes a control shaft having a lower portion and an upper portion, and wherein said upper portion is pivotable about a pivot point relative to said lower portion for said side-to-side shifting movement; and which further includes a swash plate fixed to said upper portion; and wherein said linkage includes a pair of bell cranks and a steering plate for steering said rear wheel, and which further includes a pair of spaced apart first control rods extending between said swash plate and said bell cranks in a crossed relationship, and a pair of horizontal control links extending between said bell cranks and said steering plate; and
  - a linkage between said control stick and said rear wheel operable to shift said rear wheel to a side corresponding to said control stick when said control stick is so shifted.

12. The vehicle of claim 11 wherein said horizontal control link includes a horizontal control rod and cable portion.

13. The vehicle of claim 11 which further includes a pulley associated with each control link wherein said control link rides on said pulley.

14. The vehicle of claim 11 wherein said rear wheel is carried on a cambered arm.

15. The vehicle of claim 11 which further includes a braking mechanism having a brake actuator mounted on said body/frame element for transverse rotational movement relative thereto, and which further includes at least one brake arm located at an end of said brake actuator, wherein said brake arm is placed in frictional, braking contact with a front wheel when rearward rotational movement is applied to said brake actuator.

16. The vehicle of claim 15 wherein said control stick is fixed to said brake actuator, and wherein rearward movement of said control stick is operable to provide rearward rotational movement of said brake actuator.

17. The vehicle of claim 15 which includes a brake arm located at each end of said brake actuator, and wherein the rider may selectively engage said brake arms.

18. The vehicle of claim 11 which includes a pedal mechanism having a pedal bar rotatably mounted on said body/frame element, and wherein said front wheels are carried on said pedal bar.

19. The vehicle of claim 18 wherein one of said front wheels is mounted on said pedal bar for free-wheeling and wherein the other of said front wheels is mounted on said pedal bar by a racheting drive hub.

20. The vehicle of claim 18 wherein both of said fronts wheels are mounted on said pedal bar by a racheting drive hub.

\* \* \* \* \*